United States Patent
Duan

(10) Patent No.: US 12,125,171 B2
(45) Date of Patent: Oct. 22, 2024

(54) VIDEO DENOISING METHOD AND APPARATUS, AND STORAGE MEDIUM

(71) Applicant: Tencent Technology (Shenzhen) Company Limited, Shenzhen (CN)

(72) Inventor: Zhengzhi Duan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 17/520,169

(22) Filed: Nov. 5, 2021

(65) Prior Publication Data

US 2022/0058775 A1 Feb. 24, 2022

Related U.S. Application Data

(63) Continuation of application No. PCT/CN2020/119910, filed on Oct. 9, 2020.

(30) Foreign Application Priority Data

Dec. 9, 2019 (CN) .......................... 201911251050.6

(51) Int. Cl.
*G06K 9/00* (2022.01)
*G06T 5/50* (2006.01)
(Continued)

(52) U.S. Cl.
CPC .................. *G06T 5/70* (2024.01); *G06T 5/50* (2013.01); *H04N 19/105* (2014.11);
(Continued)

(58) Field of Classification Search
None
See application file for complete search history.

(56) References Cited

U.S. PATENT DOCUMENTS

2002/0176502 A1 11/2002 Rose et al.
2007/0014365 A1 1/2007 MacInnis
(Continued)

FOREIGN PATENT DOCUMENTS

CN 101262559 A 9/2008
CN 101540834 A 9/2009
(Continued)

OTHER PUBLICATIONS

Tencent Technology, ISR, PCT/CN2020/119910, Dec. 31, 2020, 3 pgs.
(Continued)

*Primary Examiner* — Wei Wen Yang
(74) *Attorney, Agent, or Firm* — Morgan, Lewis & Bockius LLP

(57) ABSTRACT

This application relates to the field of image processing technologies, and discloses a video denoising method performed by a computing device, and a storage medium, which are configured to reduce the computation amount for video denoising and relieve network bandwidth pressure. The method includes: acquiring a current frame of a target video; in accordance with a determination that the current frame is a P frame or a B frame in the target video: determining a reference frame of the current frame from the target video according to a pre-existing time domain reference relationship between the current frame and the reference frame, the time domain reference relationship being established in advance by an encoder; determining a reference block in the reference frame corresponding to a current block in the current frame; and performing denoising on the current block according to the reference block.

11 Claims, 8 Drawing Sheets

(51) Int. Cl.
  *G06T 5/70* (2024.01)
  *H04N 19/105* (2014.01)
  *H04N 19/159* (2014.01)
  *H04N 19/176* (2014.01)
  *H04N 19/85* (2014.01)

(52) U.S. Cl.
  CPC ......... *H04N 19/159* (2014.11); *H04N 19/176* (2014.11); *H04N 19/85* (2014.11); *G06T 2207/10016* (2013.01)

(56) References Cited

U.S. PATENT DOCUMENTS

| | | | |
|---|---|---|---|
| 2008/0056366 A1 | 3/2008 | Bhaskaran | |
| 2009/0278961 A1 | 11/2009 | Mohanty et al. | |
| 2017/0280073 A1 | 9/2017 | DeBattista | |
| 2017/0374363 A1* | 12/2017 | Deng | H04N 19/176 |
| 2018/0240221 A1* | 8/2018 | Rijnders | G06T 5/10 |
| 2018/0278849 A1 | 9/2018 | Pihl et al. | |
| 2018/0343448 A1 | 11/2018 | Possos et al. | |
| 2019/0089953 A1 | 3/2019 | Chernyak et al. | |

FOREIGN PATENT DOCUMENTS

| | | | |
|---|---|---|---|
| CN | 101742288 A | 6/2010 | |
| CN | 101742290 A | 6/2010 | |
| CN | 102355556 A | 2/2012 | |
| CN | 102714718 A | 10/2012 | |
| CN | 102769722 A | 11/2012 | |
| CN | 103269412 A | 8/2013 | |
| CN | 104023166 A | 9/2014 | |
| CN | 109963048 A | 7/2019 | |
| CN | 110087077 A | 8/2019 | |
| CN | 111010495 A | 4/2020 | |
| WO | WO-2019050427 A1 * | 3/2019 | ........... H04N 19/117 |

OTHER PUBLICATIONS

Tencent Technology, WO, PCT/CN2020/119910, Dec. 31, 2020, 5 pgs.

Tencent Technology, IPRP, PCT/CN2020/119910, May 17, 2022, 6 pgs.

* cited by examiner

VIDEO DENOISING METHOD AND APPARATUS, AND STORAGE MEDIUM

CROSS-REFERENCE TO RELATED APPLICATIONS

This application is a continuation application of PCT Patent Application No. PCT/CN2020/119910, entitled "VIDEO NOISE CANCELLATION PROCESSING METHOD AND APPARATUS, AND STORAGE MEDIUM" filed on Oct. 9, 2020, which claims priority to Chinese Patent Application No. 201911251050.6, filed with the State Intellectual Property Office of the People's Republic of China on Dec. 9, 2019, and entitled "VIDEO DENOISING METHOD AND APPARATUS", all of which are incorporated herein by reference in their entirety.

FIELD OF THE TECHNOLOGY

This application relates to the field of image processing technology, and in particular, to a video denoising method and apparatus, and a storage medium.

BACKGROUND OF THE DISCLOSURE

With the development of digital media technologies and computer technologies, videos are applied to various fields such as mobile communication, online surveillance, and online television. Due to lens and cost restrictions, a luminous flux on a single pixel is relatively small, and a large amount of random noise, which is obvious especially in a dark scene, is included in an acquired video. Such noise greatly destroys clarity and quality of an image. In addition, a residual error during encoding is excessive large, resulting in an increase in a bitstream and aggravating load on a network and storage.

SUMMARY

According to an embodiment of this application, a video denoising method is provided, including:
acquiring a current frame of a target video;
determining that the current frame is a P frame or a B frame in the target video;
determining a reference frame of the current frame from the target video according to a pre-existing time domain reference relationship between the current frame and the reference frame, the time domain reference relationship being established in advance by an encoder;
determining a reference block corresponding to a current block from the reference frame, the current block being any block in the current frame; and
performing denoising on the current block according to the reference block.

According to an embodiment of this application, a video denoising apparatus is provided, the apparatus including:
an acquisition unit configured to acquire a current frame of a target video;
a judgment unit configured to determine that the current frame is a P frame or a B frame in the target video;
a determination unit configured to determine a reference frame of the current frame from the target video according to a pre-existing time domain reference relationship between the current frame and the reference frame, the time domain reference relationship being established in advance by an encoder;
a selection unit configured to select a reference block corresponding to a current block from the reference frame, the current block being any block in the current frame; and
a calculation unit configured to perform denoising on the current block according to the reference block.

In an embodiment, the selection unit is further configured to:
determine a matching block of the current block from the reference frame according to a motion vector corresponding to the current block in the encoder, the current frame having at least one reference frame, and each reference frame having one matching block of the current block;
determine a degree of matching between each matching block and the current block; and
use a matching block whose degree of matching is greater than a matching threshold as the reference block of the current block.

In some embodiments, the calculation unit is further configured to:
perform denoising on the current block by using a two-dimensional (2D) denoising algorithm in response to determining that the degrees of matching between the matching blocks and the current block are all less than or equal to the matching threshold.

In some embodiments, the calculation unit is further configured to:
calculate a weight matrix of each reference block based on a three-dimensional (3D) denoising algorithm according to the degree of matching between the reference block and the current block; and
perform weighted summation by using pixels of the current block, pixels of each reference block, and the corresponding weight matrix to obtain outputted pixels of the current block after denoising.

In some embodiments, the calculation unit is further configured to:
perform pre-denoising on the current block by using a 2D denoising algorithm.

In some embodiments, the judgment unit is further configured to determine that the current frame is an I frame in the target video.

The calculation unit is further configured to perform denoising on the I frame by using a 2D denoising algorithm.

In some embodiments, the selection unit is configured to:
reconstruct the reference frame to obtain a reconstructed frame, and use the reconstructed frame as the updated reference frame; and
determine the reference block of the current block from the reconstructed frame that is used as the updated reference frame.

In some embodiments, the selection unit is further configured to:
determine, by using a noise monitoring algorithm, whether an internal variance of the current block is greater than a denoising threshold; and perform denoising on the current block when the internal variance of the current block is greater than the denoising threshold.

According to an embodiment of this application, a computing device including at least one processor and at least one memory is provided, where the memory stores a computer program, and the program, when executed by the processor, causes the processor to perform the operations of the video denoising method provided in the embodiments of this application.

According to an embodiment of this application, a storage medium storing computer instructions is provided, where the computer instructions, when run on a computer, cause the computer to perform the operations of the video denoising method provided in the embodiments of this application.

BRIEF DESCRIPTION OF THE DRAWINGS

In order to describe the technical solutions in the embodiments of this application or related art more clearly, accompanying drawings needed in the description of the embodiments will be briefly introduced below. Obviously, the accompanying drawings in the following description are only some embodiments of this application.

DESCRIPTION OF EMBODIMENTS

Figure 1:
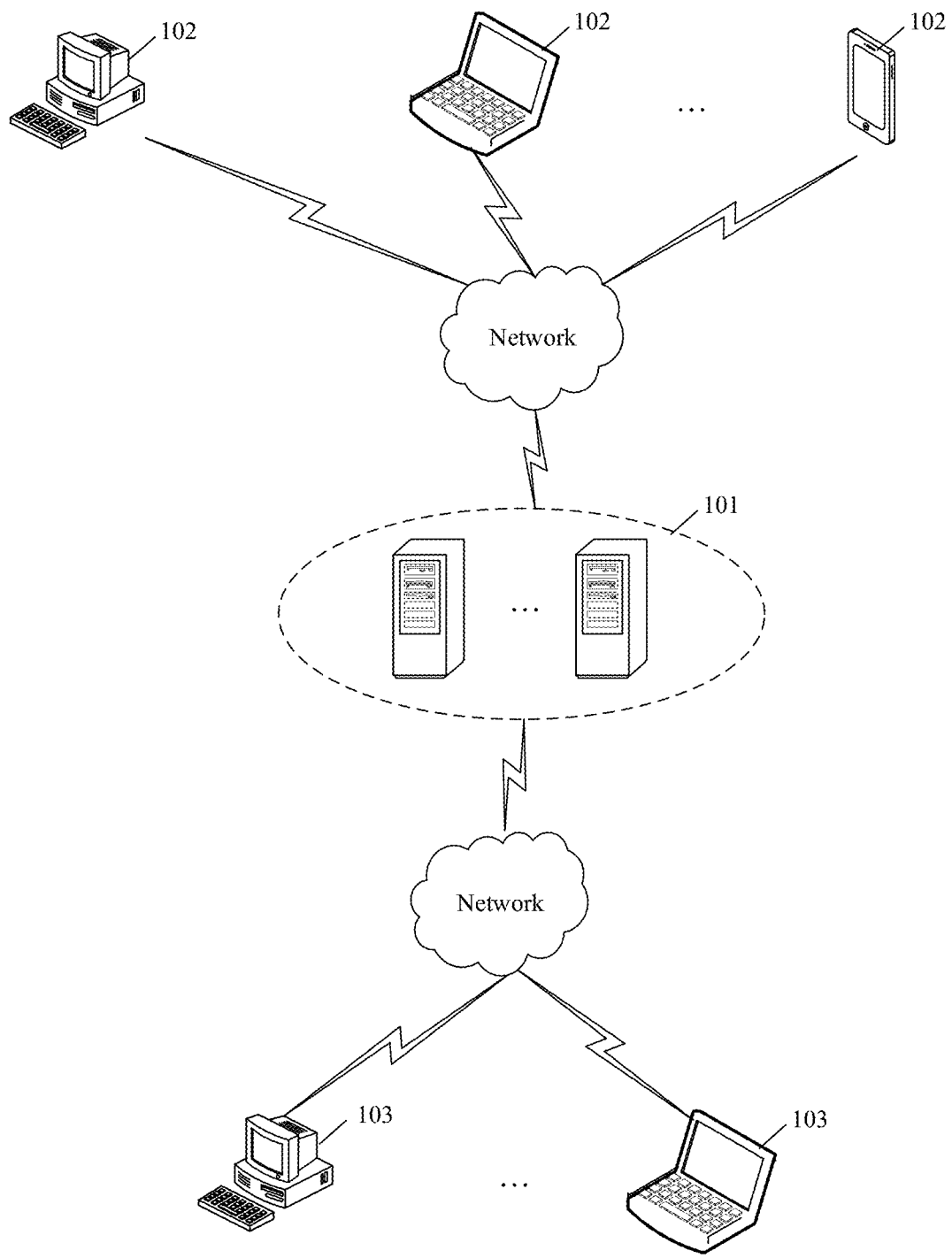
FIG. 1 is a system architectural diagram of a video denoising system according to an embodiment of this application.

To make the objectives, technical solutions, and advantages of the embodiments of this application clearer, the technical solutions in this application will be clearly and completely described in the following with reference to the accompanying drawings in the embodiments of this application. Apparently, the described embodiments are merely a part rather than all of the embodiments of the technical solutions of this application. All other embodiments obtained by a person of ordinary skill in the art based on the embodiments recorded in the document of this application without creative efforts shall fall within the protection scope of the technical solutions of this application.

In the specification, claims, and accompanying drawings of this application, the terms "first" and "second" are intended to distinguish between different objects but do not indicate a particular order. In addition, the term "include" and any other variant thereof are intended to cover a non-exclusive inclusion. For example, a process, method, system, product, or device that includes a series of steps or units is not limited to the listed steps or units, but further includes a step or unit that is not listed, or further includes another step or unit that is intrinsic to the process, method, product, or device.

The following describes some concepts involved in the embodiments of this application.

Video encoding: Original video data generated after image information is captured has a huge amount of data. For some application scenarios in which the original video data is directly played back locally after being captured, there is no need to consider the compression technology. But in reality, video transmission and storage are involved in more application scenarios. Transmission networks and storage devices cannot tolerate the huge amount of original video data, and the original video data needs to be encoded and compressed before transmission and storage.

The video encoding includes intra-frame encoding and inter-frame encoding. The intra-frame encoding is space domain encoding, which performs image compression by using image spatial redundancy, and processes an independent image and will not span a plurality of images. The space domain encoding relies on the similarity between adjacent pixels in an image and the main spatial frequency of a pattern area. The inter-frame encoding is time domain encoding, and performs image compression by using temporal redundancy between a set of consecutive images. If a certain frame of image can be used by a decoder, the decoder can obtain the next frame of image only by using a difference between the two frames. For example, several image frames with smooth motion have large similarities and small differences, while several images with violent motion have small similarities and large differences. When a complete frame of image information is obtained, the next frame of image can be calculated by using a difference value from the next frame of image, thus achieving compression of the data volume. The time domain encoding relies on the similarity between consecutive image frames, and generates the current image through "prediction" by using the received and processed image information as much as possible.

Frame: It is a single image picture in a video sequence.

I frame: An intra-coded picture (often referred to as a key frame) contains a complete picture of image information, belongs to the intra-coded image, does not contain motion vectors, and does not need to refer to other frame images during encoding and decoding. The I frame image is used for preventing accumulation and spread of errors.

P frame: A predictive-coded picture is an inter-coded frame. During encoding of an encoder, the previous I frame or P frame is used for predictive encoding.

B frame: A bi-directionally predicted picture is an inter-coded frame. During the encoding of the encoder, the previous and later I frames or P frames are used for bi-directionally predictive encoding.

Pre-analysis: Before frame data is formally encoded, a certain number of frames are analyzed in advance, and pre-analysis data is applied to guide a subsequent encoding process.

Reconstructed frame: In the encoder, after a source image is compressed, on the one hand, various types of encoding information needs to be packaged (entropy encoded) to output a bitstream; on the other hand, an inverse process of encoding is required according to the various types of encoding information, that is, reconstruction and restoration are performed on the image to obtain a reference frame consistent with that in a decoder for encoding/decoding of other frames. The reconstructed frame is not equal to the source image, and is referred to as a reconstructed frame.

Reference frame: During video encoding and decoding, the reference frame is used as reference data for other frames to acquire a reconstructed frame of inter-frame reference data during the encoding/decoding of other frames.

Motion vector: It is a two-dimensional vector used for describing the position offset that occurs when a coding block in the encoder moves from its position to another position. In brief, a set of consecutive images records movement of a target, and the motion vector is used for measuring the degree of movement of the target between two frames of images. The motion vector is composed of a horizontal displacement amount and a vertical displacement amount.

Block: It is the basic unit of encoding, and includes a macro block, a sub-macro block, a block, and other types. One block is 4×4 pixels, and the macro block and the sub-macro block are composed of a plurality of blocks. The macro block usually has a size of 16×16 pixels, and is classified into I, B, and P macro blocks.

BM3D (Block Matching 3D): It is an industry-recognized processing technology with better effects, for image denoising by searching for matching blocks and by using other transformation techniques or filtering within the image.

3D video denoising: It is a technical method used in a video for denoising by using own information (space domain information) of the present frame image and reference information (time domain information) of frame images in front of and behind it to improve the image quality or definition.

2D denoising: Denoising is performed within a frame by analyzing the relationship between spatial neighboring data of pixels in the frame, also referred to as space domain denoising.

Bilateral filtering algorithm: It is a 2D neighborhood denoising algorithm. The algorithm takes into account the distance and pixel difference between a pixel to be filtered and its surrounding pixels when taking weights of adjacent pixels.

SSD: Sum of squared difference is often used for measuring the degree of matching of two blocks. A smaller value indicates a smaller difference between the two blocks and a higher degree of matching.

At present, a video denoising technology based on the BM3D algorithm is generally used for video denoising. However, due to the complexity of the algorithm, the video processing speed is very slow, which has a large impact especially for bandwidth-constrained real-time streaming media services, mobile video phones, online video chats, etc.

A video denoising method is proposed in the embodiments of this application, and is mainly applied to scenarios such as real-time video calls, instant video communication, video conferencing, real-time video capture, and live transcoding, which can reduce the computation amount of video denoising and alleviate network bandwidth pressure. Refer to FIG. 1, an architectural diagram of a video denoising system according to an embodiment of this application is shown, including a server 101, a first terminal 102, and a second terminal 103.

The first terminal 102 and/or the second terminal 103 may be an electronic device with a wireless communication function, such as a mobile phone, a tablet computer, or a dedicated handheld device, or may be a device connected to the Internet in a wired access manner, such as a personal computer (PC for short), a notebook computer, and a server.

The server 101 may be a network device such as a computer. The server 101 may be an independent device or a server cluster formed by a plurality of servers. The server 101 may perform information processing by using the cloud computing technology.

The network in the system may be the INTERNET network, or a mobile communication system such as the Global System for Mobile Communications (GSM) and the Long Term Evolution (LTE) system.

The video denoising method in this embodiment of this application may be executed by the server 101. The video in this embodiment of this application may be a communication video stream of communication between the first terminal 102 and the second terminal 103, such as a video captured by a capturing device of the first terminal 102 and transmitted to the second terminal 103, or a video captured by a capturing device of the second terminal 103 and transmitted to the first terminal 102.

At this time, the server 101 may be a server that provides video forwarding. A video capturing device may be integrated in the terminal, such as a front camera or a rear camera of a mobile phone terminal, and an image capturing device may also be a device that exists independently of the terminal but is in communication connection with the terminal, for example, a camera connected to a computer terminal and the like.

In this embodiment of this application, the server 101 may perform denoising on a target video transmitted by the first terminal 102 to the second terminal 103, or the server 101 may perform denoising on a target video transmitted by the second terminal 103 to the first terminal 102. The server 101 may also perform denoising on a target video stream transmitted by the first terminal 102 to the second terminal 103 and a target video stream transmitted by the second terminal 103 to the first terminal 102 at the same time.

In other embodiments, the video denoising method may also be executed by the terminal. Compared with the foregoing embodiment, the main difference is that an executive subject is changed from the server to the terminal. For example, the first terminal 102 may perform denoising on the target video transmitted to the second terminal 103, or perform denoising on the target video transmitted by the second terminal 103 to itself, or perform denoising on the target video transmitted to the second terminal 103 and the target video transmitted by the second terminal 103 to itself at the same time. The second terminal 103 is similar to the first terminal 102. Optionally, the video denoising method performed by the terminal in this embodiment of this application may alternatively be performed by a client installed on the terminal.

In still other embodiments, the video denoising method may also be executed jointly by the server 101 and the terminal. A main denoising logic is set on the user terminal, and a logic for how to configure an encoder is set on the server. For example, the terminal provides a target video to the server; the server generates a corresponding encoding parameter according to the provided target video, including a reference frame corresponding to a P frame or a B frame, and transmits the encoding parameter to the terminal side; and the terminal controls the encoder to determine a reference block according to the encoding parameter, and performs denoising on the current block by using the reference block.

The foregoing application scenario is illustrated merely for ease of understanding of the spirits and principles of this application, and the embodiments of this application are not limited in this aspect. On the contrary, the embodiments of this application can be applied to any applicable scenario.

The video denoising method provided in this embodiment of this application is described below with reference to the application scenario shown in FIG. 1.

Figure 2A:
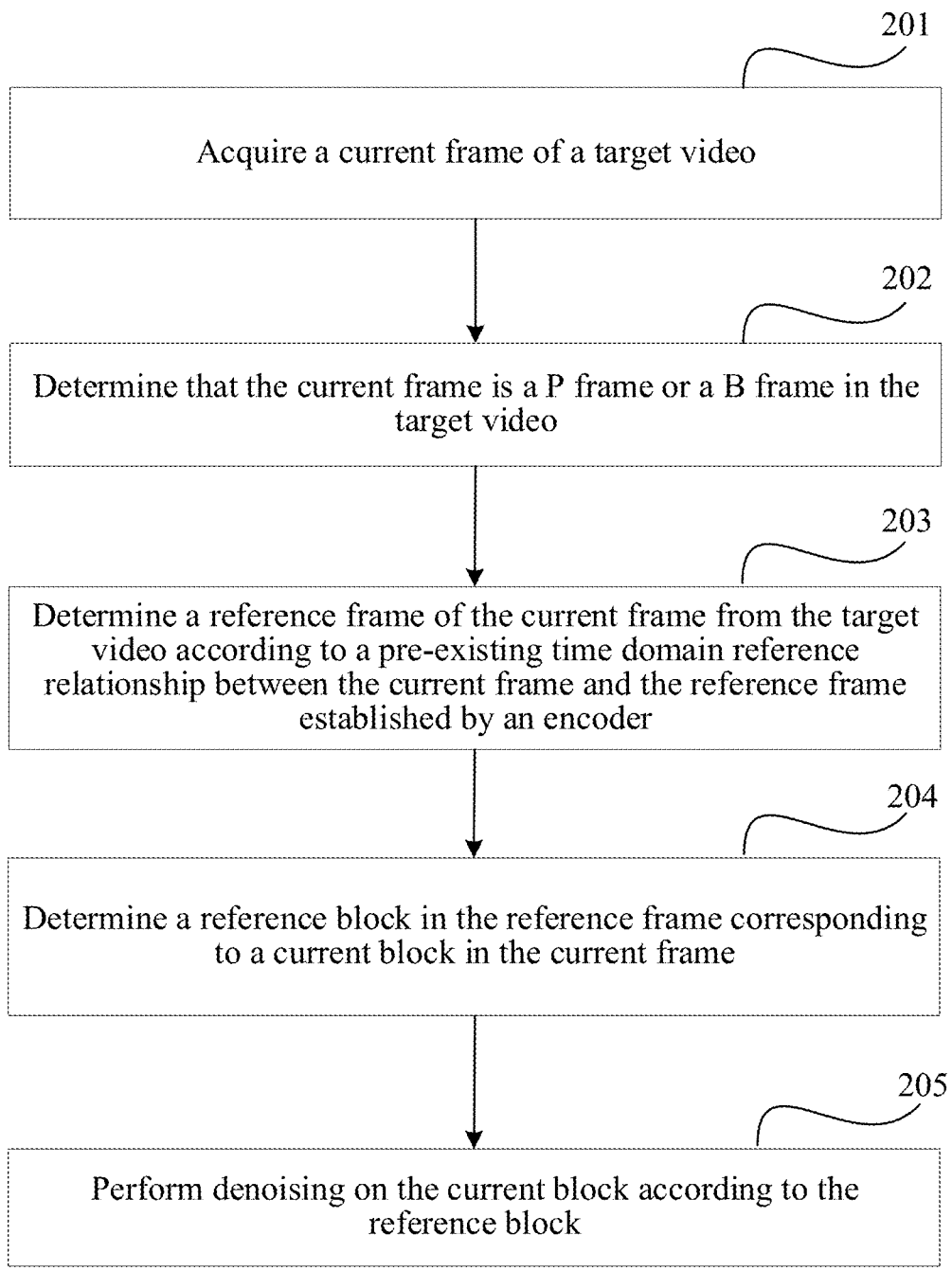
FIG. 2A is a flowchart of a video denoising method according to an embodiment of this application.

Refer to FIG. 2A, a video denoising method is provided in an embodiment of this application, which is executed by a computing device, and the computing device may be a server or a terminal. As shown in FIG. 2A, the method includes:

Step S201: Obtain a current frame of a target video.

In a specific implementation process, the target video may be a video captured by the terminal through an integrated capturing device thereof, or may be a video captured by an independent capturing device connected to the terminal via a wired or wireless network. After the terminal acquires the target video, the terminal may perform denoising on the target video, or the terminal may transmit the target video to a server, and the server may perform denoising on the target video.

Step S202: Determine a frame type of the current frame. In some embodiments, the current frame is a P frame or a B frame in the target video.

Inside an encoder such as X264 and X265 (an encoding implementation of the video encoding/decoding standard), in a pre-analysis processing stage, a frame type of each frame may be determined by pre-analyzing each frame, specifically the complexity, intra-frame prediction, inter-frame prediction analysis, statistical intra/inter-frame cost comparison, scene detection, and the like of an image with a width and a height that are reduced to ½ of those corresponding to each frame, in combination with some specified encoding parameters, such as the number of B frames or the size of a GOP (Group of Pictures).

Specifically, a GOP is a stream of data composed of a set of images whose contents are not very different. When the motion changes little, a GOP may be very long, because the little motion change indicates that the content of the image screen changes very little, and therefore, one I frame may be set, and then a plurality of P frames and B frames may be set. When the motion changes a lot, one GOP may be relatively short, for example, it only contains one I frame and 3 or 4 P frames. The I frame is a frame obtained by compression after redundant information of an image space is removed at the maximum, has all the image information, and can be decoded independently without referring to other frames. The I frame is referred to as an intra-coded frame. All videos each contain at least one I frame, which is the first frame of the video, and other I frames in the video are used for improving the video quality. The P frame decodes/encodes data of the present frame by using a difference between the present frame and a previous frame (I frame or P frame), and the B frame decodes/encodes data of the present frame by using a difference value between the present frame and the previous frame and a difference value between the present frame and the subsequent frame. A 3D denoising algorithm in this embodiment of this application mainly targets the P frame and the B frame in the target video.

Step S203: Determine a reference frame of the current frame from the target video according to a pre-existing time domain reference relationship between the current frame and the reference frame established by an encoder.

Specifically, when the current frame is a P frame or a B frame, the encoder will determine the time domain reference relationship such as the reference frame of the current frame and a motion vector in the pre-analysis process, for subsequent encoding/decoding of the current frame. This embodiment of this application multiplexes the time domain reference relationship such as the reference frame and the motion vector used for encoding/decoding the current frame in the encoder, and performs denoising on the current frame by using the reference frame of the current frame. For example, the encoder will determine two forward reference frames for the P frame; and will provide two forward reference frames and two backward reference frames, i.e., a total of four reference frames, for the B frame.

Figure 3A:
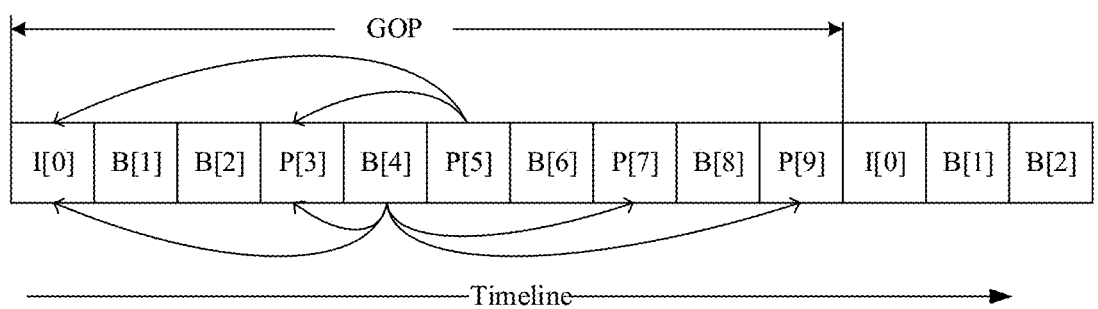
FIG. 3A is a schematic diagram of a video sequence according to an embodiment of this application.

For example, in the video sequence shown in FIG. 3A, for a P frame with a sequence number of 5, corresponding reference frames are an I frame with a sequence number of 0 and a P frame with a sequence number of 3. For a B frame with a sequence number of 4, corresponding reference frames are two forward frames with sequence numbers 0 and 3 and two backward frames with sequence numbers 7 and 9, respectively.

The reference frame and the current frame may or may not be adjacent. Different reference frames corresponding to the same current frame may or may not be adjacent. In addition, the number of reference frames and the positional relationship with the current frame may be set arbitrarily, which are not limited in this embodiment of this application.

Step S204: Determine, from the reference frame, a reference block corresponding to a current block in the current frame.

Specifically, in this embodiment of this application, each frame of image of the target video is processed in blocks, and the size of a reference block is the same as the size of the current block. The size of the current block here may be 8×8 pixels, and the size of the corresponding reference block is also 8×8 pixels. Alternatively, the size of the current block is 16×16 pixels, and the size of the corresponding reference block is also 16×16 pixels. Of course, the size of the block is not limited in this embodiment of this application.

Step S205: Perform denoising on the current block according to the reference block.

In this embodiment of this application, the current frame of the target video is acquired inside the encoder, and after determining that the current frame is the P frame or the B frame in the target video, the encoder is used to determine the reference frame of the current frame from the target video. The reference block corresponding to the current block is determined from the reference frame, where the current block is any block in the current frame, and denoising is performed on the current block according to the reference block. It is necessary to establish a reference relationship between the current frame and the reference frame inside the encoder for video encoding, this embodiment of this application performs noise removal on the current frame by multiplexing the reference relationship between the current frame and the reference frame inside the encoder. Therefore, the computation amount may be reduced, the operation time may be shortened, and the network bandwidth pressure may be relieved, thus meeting requirements of real-time video denoising.

The I frame in the video sequence does not need to refer to other frame images during encoding/decoding; therefore, in this embodiment of this application, for the I frame, 2D denoising is performed directly without referring to other frames. After the current frame of the target video is acquired, the method further includes:

performing denoising on the I frame by using a 2D denoising algorithm in response to determining that the current frame is an I frame in the target video.

Specifically, after the current frame is acquired, if the current frame is an I frame, denoising is performed by using the 2D denoising algorithm; if the current frame is a P frame or B frame, denoising is performed by using a 3D denoising algorithm. The two denoising algorithms are introduced in detail below respectively.

The 2D denoising algorithm in this embodiment of this application may be a regional bilateral filtering algorithm, a Gaussian filtering algorithm, and the like. The following introduction takes the regional bilateral filtering algorithm as an example. In the bilateral filtering algorithm for an n×m region, the n×m region generally takes 3×3 pixels, or 5×5 pixels, or 7×7 pixels. Taking 5×5 as an example, the following formula is used for filtering calculation:

$$\text{denoised\_pix}[i][j] = \frac{\sum_{\substack{m=-2 \\ n=-2}}^{2} (coef[m][n] * src_{block[i+m][j+n]})}{\sum_{\substack{m=-2 \\ n=-2}}^{2} coef[m][n]} \quad \text{Formula 1}$$

where, denoised_pixl[i][j] is a pixel value after a pixel [i][j] is denoised; src is a pixel value of a block block[i+m][j+n]; coef[m][n] is a filter coefficient, which is selected according to an absolute value diffVal of a difference between the pixel in the n×m region and a center pixel as well as a position relationship and a bilateral filtering level table, and specifically may be determined according to the following formula:

$$coefTable[t_{num}][diffVal][m][n] = e^{-\frac{diffVal}{table[t_{num}]}} * e^{-\frac{n^2+m^2}{2*\delta^2}} * 64 \quad \text{Formula 2}$$

where, coefTable[$t_{num}$] is a bilateral filtering level table based on filtering levels in 2D filtering; in one embodiment, $t_{num}$ is 0-9, representing 10 denoising levels; in one embodiment, values of Table[$t_{num}$] are: {2, 3, 5, 8, 11, 15, 19, 24, 29, 32}; diffval is a difference between a current pixel value and a pixel value in a filter template, and an excessive diffval may be restricted (for example: 0-31) during the implementation; [m][n] is the distance between the current pixel in the n×m region and a reference pixel, and a value thereof is $$\{[-\frac{m}{2}, \frac{m}{2}][-\frac{n}{2}, \frac{n}{2}]\};$$

and $\delta^2$ is used for measuring a noise level, and in one embodiment, a value thereof may be $t_{num}<4?4:t_{num}<7?6:9$.

Further, since the 2D denoising algorithm performs denoising by using local weighted average, it is inevitable that details or borders will be blurred to a certain extent. In order to improve the 2D denoising effect, a certain amount of sharpening compensation may be added after denoising, and a pixel value after the sharpening compensation is added is calculated according to the following formula:

denoised_ed_pixl=average+sharp_ratio*(denoised_
ed_pixl−average)    Formula 3 where, average is an average value of pixels in the n×m region corresponding to the current pixel value; and sharp_ratio is a sharpening compensation parameter, which is of the type of double and takes a value of −2.0 to 2.0.

For the P frames or B frames in the target video, filtering calculation is performed by using a current block with a size of 8×8 pixels or 16×16 pixels as a unit in this embodiment of this application. The specific process is as follows:

Before denoising is performed by using the 3D denoising algorithm, pre-denoising may also be performed on the current block by using a 2D denoising algorithm, so as to further improve the denoising effect.

Before denoising is performed on the current block by using the 3D denoising algorithm, a noise monitoring algorithm may further be used first to calculate an internal variance of the current block. When the internal variance of the current block is greater than a denoising threshold, the subsequent denoising is performed. When the internal variance of the current block is less than or equal to the denoising threshold, the subsequent denoising is not performed. The internal variance of the current block may be used for representing the internal complexity of the current block. When the internal variance is less than or equal to the denoising threshold, the internal complexity of the current block may be considered to be small, and the denoising process may be omitted, thereby further reducing the computation amount to shorten the denoising duration of the video.

Figure 2B:
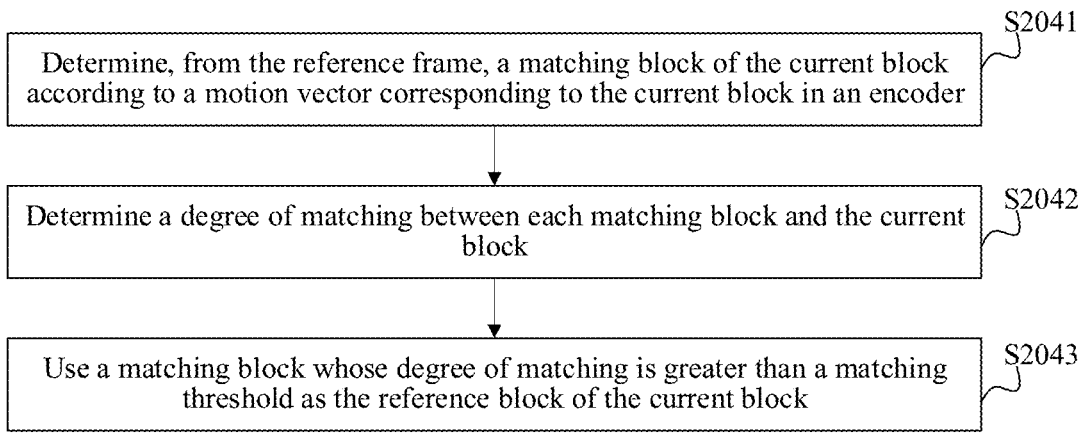
FIG. 2B is a flowchart of a method for determining a reference block corresponding to a current block from a reference frame according to an embodiment of this application.

In response to determining that the internal variance of the current block is greater than the denoising threshold, 3D denoising is performed on the current block by using the reference block. As for the determination of the reference block, FIG. 2B shows a flowchart of a method for determining a reference block corresponding to a current block from a reference frame according to an embodiment of this application. As shown in FIG. 2B, the method includes the following steps:

Step S2041: Determine, from the reference frame, a matching block of the current block according to a motion vector corresponding to the current block in the encoder, the current frame having at least one reference frame, and each reference frame having one matching block of the current block.

Step S2042: Determine a degree of matching between each matching block and the current block;

Step S2043: Use a matching block whose degree of matching is greater than a matching threshold as a reference block of the current block.

In a specific implementation process, a block with a size of 8×8 pixels or 16×16 pixels may be used as a unit for denoising, that is, the size of the current block may be 8×8 pixels or 16×16 pixels. Correspondingly, the size of the matching block corresponding to the current block in the reference frame is also 8×8 pixels or 16×16 pixels. The relationship between the position of the current block in the current frame and the position of the matching block in the reference frame is represented by a motion vector, which is provided by the encoder in the pre-analysis process.

Figure 3B:
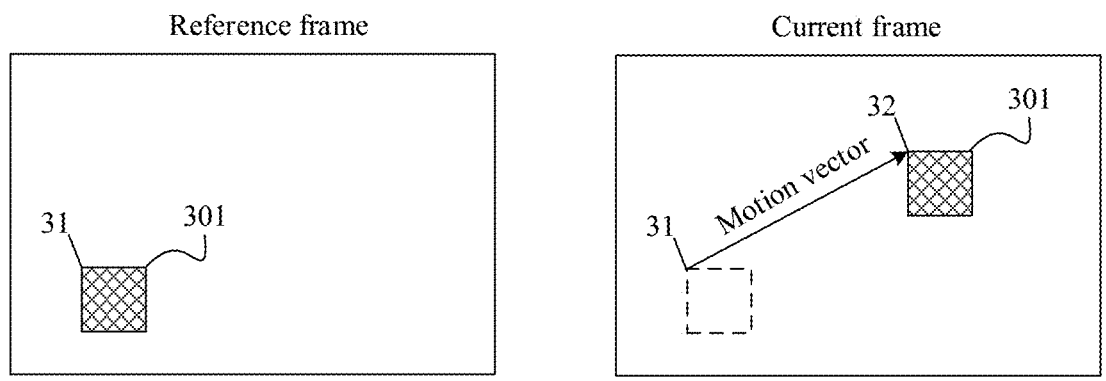
FIG. 3B is a schematic diagram of a motion vector of a target between a current frame and a reference frame according to an embodiment of this application.

FIG. 3B is a schematic diagram of a motion vector of a target between a current frame and a reference frame. Images in a video are generally changing, and when a target 301 moves, its position will change but the shape and color are basically unchanged. A decoder uses the motion vector to show that the target moves from a position 31 in the reference frame to a position 32 in the current frame. Assuming that the situation in FIG. 3B is ideal, and there is no change in any other attributes of the target except the moving position, then a difference between the two images only contains data amount of the motion vector.

Therefore, for the current block, the motion vector may be used to determine a unique corresponding matching block in a reference frame, and determine the matching block by directly using the motion vector provided by the encoder, which may reduce the computation amount. The number of matching blocks is the same as the number of reference frames, that is, one matching block of the current block may be determined in one reference frame. In addition, the current frame corresponds to a plurality of reference frames, and therefore, a plurality of corresponding matching blocks may be determined for one current block. For example, for a P frame having 2 reference frames, there are 2 matching blocks for the current block in the P frame. For a B frame having 4 reference frames, there are 4 matching blocks for the current block in the B frame.

For a plurality of matching blocks, a degree of matching between each matching block and the current block needs to be calculated, and a reference block of the current block is selected from the matching blocks according to the degrees of matching. A matching block whose degree of matching is greater than a matching threshold is used as the reference block. A matching block whose degree of matching is less than or equal to the matching threshold is discarded. For example, an algorithm for the degree of matching may be an SSD (sum of squared difference) algorithm, which is used for measuring the degree of matching between two blocks. A smaller value of the SSD indicates a smaller difference between the current block and the matching block and a higher degree of matching. Alternatively, a correlation matching method is used, and a multiplication operation is adopted. A larger value indicates a higher degree of matching. Alternatively, a correlation coefficient matching method is used. When a value is 1, the degree of matching is the highest, and when the value is −1, the degree of matching is the lowest. Alternatively, the degree of matching is measured by using SSE (residual sum of squares/sum squared residual). If the SSE between a matching block and the current block is less than a threshold, the matching block is used as the reference block; otherwise, the matching block is discarded.

Further, if the degrees of matching between the matching blocks and the current block are all less than or equal to the matching threshold, denoising is performed on the current block by using the 2D denoising algorithm, thereby improving the effect of denoising.

Figure 2C:
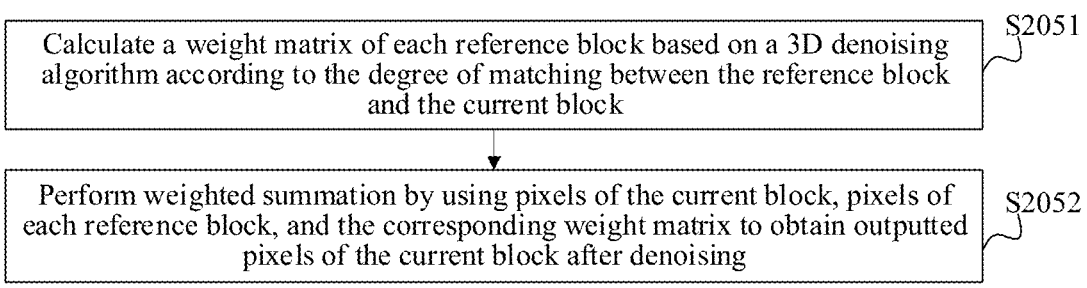
FIG. 2C is a flowchart of a method for performing denoising on a current block according to a reference block according to an embodiment of this application.

For the reference block whose degree of matching is greater than the matching threshold, denoising is performed on the current block according to the reference block. FIG. 2C is a flowchart of a method for performing denoising on the current block according to the reference block. As shown in FIG. 2C, the method includes the following steps:

Step S2051: Calculate a weight matrix of each reference block based on a 3D denoising algorithm according to the degree of matching between the reference block and the current block.

Specifically, the weight matrix of a reference block may be calculated according to the following formula:

$$w_n[i][j] = \begin{cases} \alpha^{abs(poc_0 - poc_{ref_n})} * f(SSE_n) * coefTable[t_{num}][diffVal][0][0] & n != 0 \\ \dfrac{256}{num_{ref} + 1} * coefTable[t_{num}][0][0][0] & n == 0 \end{cases}$$

Formula 4 where, $w_n[i][j]$ is a weight matrix of the $n^{th}$ reference block; n represents the $n^{th}$ reference block, and when n is 0, it represents the weight of the current block itself; $poc_0$ is a sequence number of a frame where the current block is located; $poc_{ref_n}$ is a sequence number of a frame where the $n^{th}$ reference block is located; α is an attenuation factor based on the distance of the reference frame, and a typical value thereof is 0.95; diffVal is an absolute value difference between the $[i,j]^{th}$ pixel corresponding to the $n^{th}$ reference block and the $[i,j]^{th}$ pixel of the current block; coefTable $[t_{num}]$ is a bilateral filtering level table based on filtering levels in 2D filtering; and $num_{ref}$ represents the number of reference blocks. In addition, $SSE_n$ is the degree of matching between the reference block and the current block; and $f(SSE_n)$ represents a weighting factor based on the degree of matching, which may be calculated as follows:

$$f(SSE) = \\ refweiht * \begin{cases} 0 & (sse \gg 4) > ref\_th[3] \\ 1/4\, ref\_th[3] - 1 > (sse \gg 4) > ref\_th[2] \\ 2/4\, ref\_th[2] - 1 > (sse \gg 4) > ref\_th[1] \\ 3/4\, ref\_th[1] - 1 > (sse \gg 4) > ref\_th[0] \\ 1 & else \end{cases}$$

Formula 5 where, ref_th is the degree of matching, and when the current block with a size of 16×16 pixels (chroma 8×8) is processed, a value of refweiht may be an empirical parameter, for example, the luminance component is 225 and the chrominance component is 256. A value of ref_th is {40, 120, 320, 500} for brightness and {10, 140, 80, 125} for chromaticity.

Step S2052: Perform weighted summation by using pixels of the current block, pixels of each reference block, and the corresponding weight matrix to obtain outputted pixels of the current block after denoising.

Specifically, the outputted pixels of the current block after denoising may be calculated according to the following formula:

$$denoised\_pixl[i][j] = \dfrac{\sum_0^n (w_n[i][j] * block_n[i][j])}{\sum_0^n w_n[i][j]}$$

Formula 6 where, denoised_pixl[i][j] is a pixel value of the pixel [i][j] after denoising; $w_n[i][j]$ is a weight matrix of the $n^{th}$ reference block, and $block_n[i][j]$ is the inputted pixel of the $n^{th}$ reference block; in particular, when n is 0, it represents the weight matrix of the current block itself, and $block_n[i][j]$ is the inputted pixel of the current block.

Figure 2D:
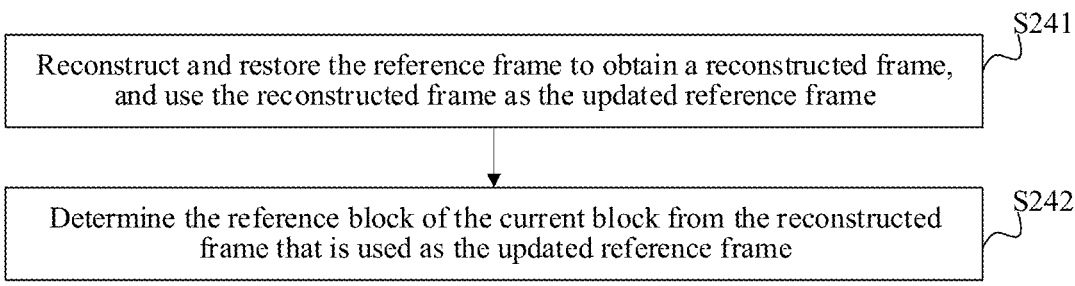
FIG. 2D is a flowchart of a method for determining a reference block of a current block from a reference frame according to an embodiment of this application.

In some embodiments, in order to further improve the quality of denoising, the reference block of the current block is determined from the reference frame. FIG. 2D is a flowchart of a method for determining a reference block of a current block from a reference frame according to an embodiment of this application. As shown in FIG. 2D, the method includes the following steps:

Step S241: Reconstruct the reference frame to obtain a reconstructed frame, and use the reconstructed frame as the updated reference frame.

Step S242: Determine the reference block of the current block from the reconstructed frame that is used as the updated reference frame.

In the specific implementation process, all matching blocks come from the reconstructed frame in the encoder. In other words, the reference block also comes from the reconstructed frame in the encoder. The reconstructed frame is an inverse process of the encoding process according to various types of encoding information after a source image is compressed by the encoder, that is, the image is reconstructed to obtain the reconstructed frame, and the reference frame is determined from the reconstructed frame for encoding/decoding of other frames. This embodiment of this application determines the reference frame from the reconstructed frame in the encoding. Compared with the source image, the reconstructed frame is a frame that has undergone filtering and denoising. For a source video with noise pollution, the image quality of the reconstructed frame is higher, and a better filtering effect can be achieved.

Figure 4A:
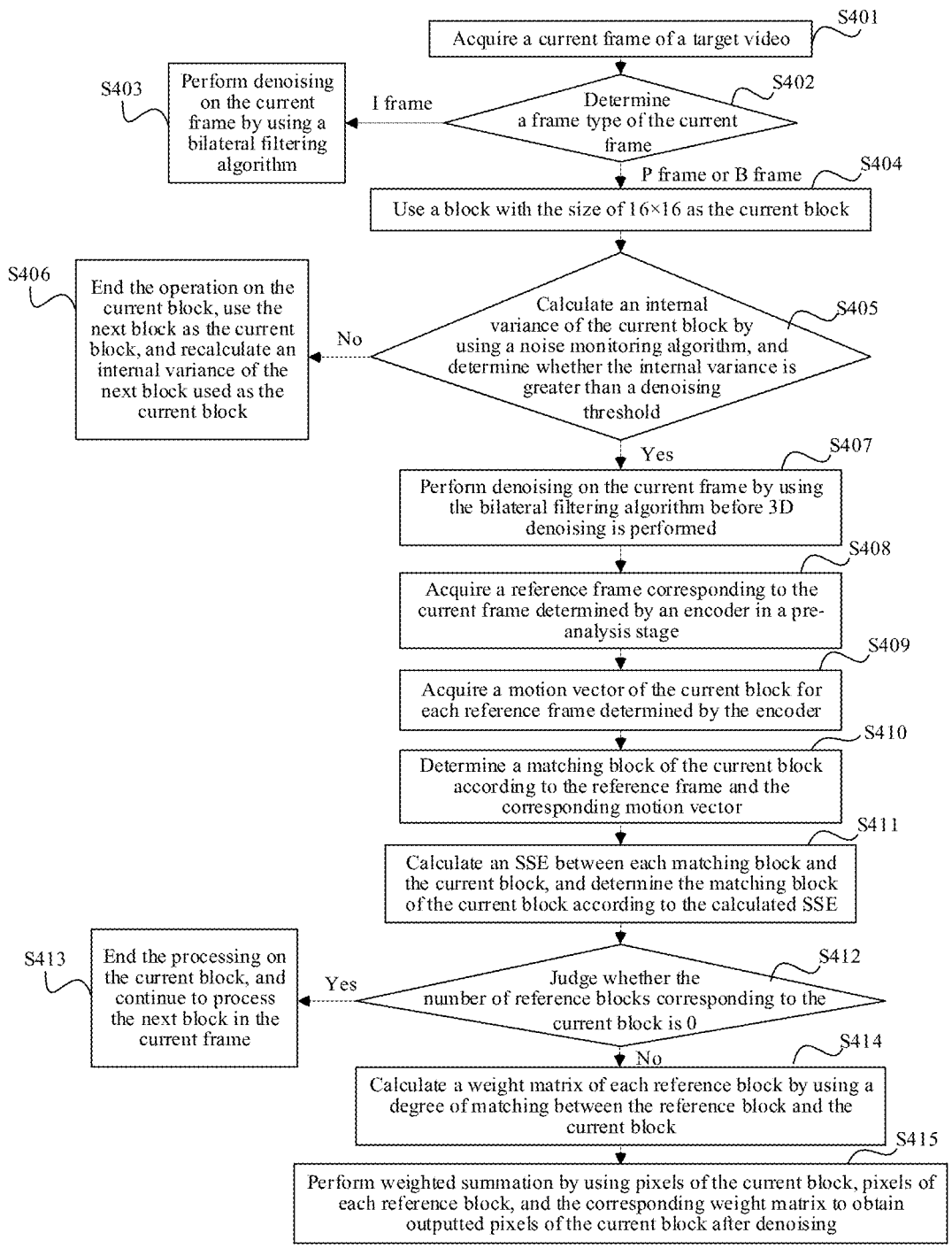
FIG. 4A is a flowchart of a video denoising method according to an embodiment of this application.

The above process will be described in detail below with specific embodiments. FIG. 4A is a flowchart of a video denoising method according to an embodiment of this application. As shown in FIG. 4A, the embodiment includes the following steps:

Step S401: Acquire a current frame in a target video.

Step S402: Determine a frame type of the current frame, if the current frame is an I frame, perform step S403; and if the current frame is a P frame or B frame, perform step S404.

Step S403: Perform denoising on the current frame by using a bilateral filtering algorithm.

Step S404: Use a block with a size of 16×16 in the current frame as a current block.

Step S405: Calculate an internal variance of the current block by using a noise monitoring algorithm, and determine whether the internal variance is greater than a denoising threshold, when the internal variance is greater than the denoising threshold, perform 3D denoising on the current block by using the reference block, and perform step S407; and when the internal variance is less than or equal to the denoising threshold, it may be considered that the internal complexity of the current block is small, omit the denoising process, and perform step S406.

Step S406: End the operation on the current block, use the next block as the current block, and recalculate an internal variance of the next block that is used as the current block.

Step S407: Perform denoising on the current block by using the bilateral filtering algorithm before performing 3D denoising.

Step S408: Acquire a reference frame corresponding to the current frame determined in a pre-analysis stage of an encoder.

If the current frame is a P frame, the number of reference frames is 2; and if the current frame is a B frame, the number of reference frames is 4.

Step S409: Acquire a motion vector for each reference frame of the current block determined by the encoder.

Step S410: Determine a matching block of the current block according to the reference frame and the corresponding motion vector.

If the current block is a block in the P frame, the current block correspondingly has 2 matching blocks; and if the current block is a block in the B frame, the current block correspondingly has 4 matching blocks.

Step S411: Calculate an SSE between each matching block and the current block, and determine the matching block of the current block according to the calculated SSE. Specifically, the matching block whose SSE is less than ref_th[3] in Formula 5 may be used as the reference block of the current block, and the matching block whose SSE is greater than or equal to ref_th[3] in Formula 5 may be discarded.

Step S412: Determine whether the number of reference blocks corresponding to the current block is 0, if the number is 0, perform step S413; and if the number is not equal to 0, perform step S414.

Step S413: End the processing on the current block, and continue to process the next block in the current frame.

Step S414: Calculate a weight matrix of each reference block by using a degree of matching between the reference block and the current block.

Step S415: Perform weighted summation by using pixels of the current block, pixels of each reference block, and the corresponding weight matrix to obtain outputted pixels of the current block after denoising.

Denoising calculation is performed on all blocks in the current frame in turn.

At present, there are many video denoising algorithms, but each type of algorithm has a limitation. Generally, the resolution and bit rate of the video image obtained by the denoising method with a small computation amount are poor, and the algorithm with a good denoising effect has a large computation amount and cannot well adapt to real-time requirements of videos.

Figure 4B:
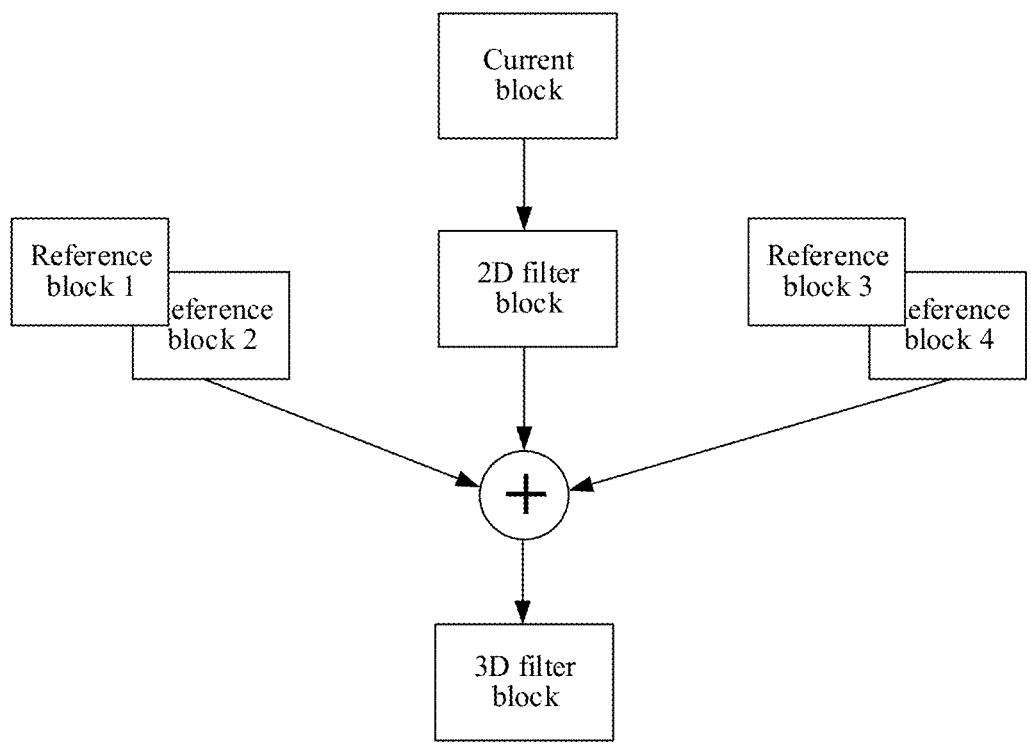
FIG. 4B is a schematic diagram of a 3D filtering process according to an embodiment of this application.
Figure 5:
FIG. 5 is an image comparison diagram before and after video denoising according to an embodiment of this application.

FIG. 4B is a schematic diagram of a 3D filtering process. As shown in FIG. 4B, in this embodiment of this application, multiplexing the time domain reference relationship inside the encoder greatly reduces the complexity of the video denoising algorithm, thereby reducing the calculation time while ensuring the definition of the video. A good balance of effect and performance can be achieved in application scenarios such as real-time encoding or transcoding. After the algorithm is integrated and implemented in X264, for a 1280×720p video on an Intel E5-2670 V4 cpu machine, the processing speed may be as high as 200 fps or more at a fast level, which meets requirements of live broadcast transcoding, and is especially applicable to live broadcast scenarios. FIG. 5 shows image comparison before and after video denoising. In the two corresponding images, the left image is an original image, and the right image is an image after denoising. As can be seen, the video denoising method in this embodiment of this application can effectively remove the noise generated during shooting, improve the video definition, and greatly reduce the bit rate. For some noisy videos, the bit rate may be saved as high as 100%.

The following describes apparatus embodiments of this application. For details not described in the apparatus embodiments, refer to the foregoing method embodiments that are in a one-to-one correspondence to the apparatus embodiments.

Figure 6:
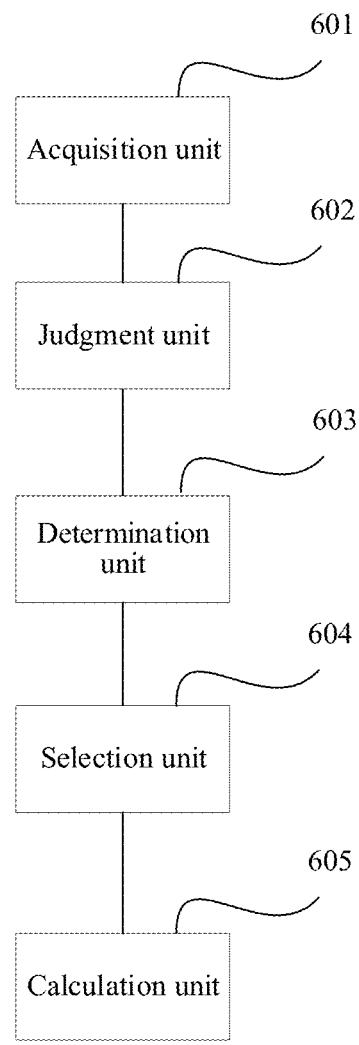
FIG. 6 is a structural block diagram of a video denoising apparatus according to an embodiment of this application.

Refer to FIG. 6, a structural block diagram of a video denoising apparatus according to an embodiment of this application is shown. The video denoising apparatus may be implemented as all or part of the server in FIG. 1 or all or part of the terminal in FIG. 1 through hardware or a combination of software and hardware. The apparatus includes: an acquisition unit 601, a judgment unit 602, a determination unit 603, a selection unit 604, and a calculation unit 605.

The acquisition unit 601 is configured to acquire a current frame of a target video.

The judgment unit 602 is configured to determine that the current frame is a P frame or a B frame in the target video.

The determination unit 603 is configured to determine a reference frame of the current frame from the target video according to a time domain reference relationship between the current frame and the reference frame established in advance by an encoder.

The selection unit 604 is configured to determine a reference block corresponding to a current block from the reference frame, the current block being any block in the current frame.

The calculation unit 605 is configured to perform denoising on the current block according to the reference block.

In some embodiments, the selection unit 604 is further configured to:
determine a matching block of the current block from a reference frame according to a motion vector corresponding to the current block in the encoder, the current frame having at least one reference frame, and each reference frame having one matching block of the current block;
determine a degree of matching between each matching block and the current block; and
use the matching block whose degree of matching is greater than a matching threshold as the reference block of the current block.

In some embodiments, the calculation unit 605 is further configured to:
determine that the degrees of matching between the matching blocks and the current block are all less than or equal to the matching threshold; and
perform denoising on the current block by using a 2D denoising algorithm.

In some embodiments, the calculation unit 605 is further configured to:
calculate a weight matrix of each reference block based on a 3D denoising algorithm according to the degree of matching between the reference block and the current block; and
perform weighted summation by using pixels of the current block, pixels of each reference block, and the corresponding weight matrix to obtain outputted pixels of the current block after denoising.

In some embodiments, the calculation unit 605 is further configured to:
perform pre-denoising on the current block by using a 2D denoising algorithm.

In some embodiments, the judgment unit 602 is further configured to determine that the current frame is an I frame in the target video.

The calculation unit is further configured to perform denoising on the I frame by using a 2D denoising algorithm.

In some embodiments, the selection unit 604 is configured to:
reconstruct the reference frame to obtain a reconstructed frame; and
determine the reference block of the current block from the reconstructed frame.

In some embodiments, the selection unit 604 is further configured to:
determine, by using a noise monitoring algorithm, that an internal variance of the current block is greater than a denoising threshold.

In this application, the term "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units. Moreover, each unit can be part of an overall unit that includes the functionalities of the unit.

Figure 7:
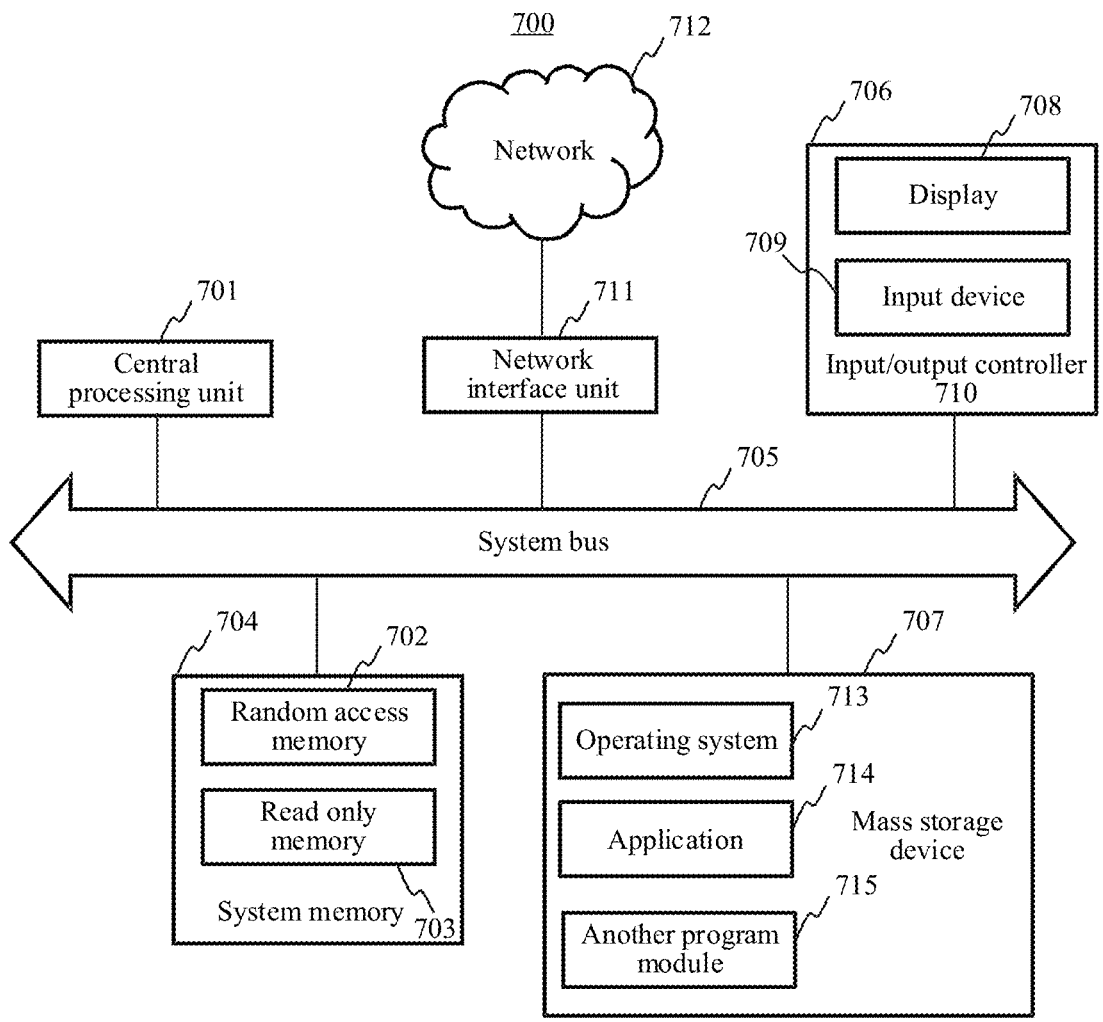
FIG. 7 is a structural block diagram of a device according to an embodiment of this application.

Refer to FIG. 7, a structural block diagram of a computing device according to an embodiment of this application is shown. The computing device 700 may be implemented as the server or terminal in FIG. 1.

Specifically, the computing device 700 includes a central processing unit (CPU) 701, a system memory 704 including a random access memory (RAM) 702 and a read-only memory (ROM) 703, and a system bus 705 connecting the system memory 704 and the CPU 701. The server 700 further includes a basic input/output system (I/O system) 706 for transmitting information between components in a computer, and a mass storage device 707 configured to store an operating system 713, an application program 714, and another program module 715.

The basic I/O system 706 includes a display 708 configured to display information, and an input device 709 configured to allow a user to enter information, for example, a mouse or a keyboard. The display 708 and the input device 709 are both connected to the central processing unit 701 by using the system bus 705 connected to an I/O controller 710. The basic I/O system 706 may further include the I/O controller 710, to receive and process input from multiple other devices such as a keyboard, a mouse, and an electronic stylus. Similarly, the I/O controller 710 further provides an output to a display, a printer or another type of output device.

The mass storage device 707 is connected to the CPU 701 by using a mass storage controller (not shown) connected to the system bus 705. The mass storage device 707 and a computer-readable medium associated with the mass storage device 707 provide non-volatile storage for the server 700. That is, the mass storage device 707 may include the computer readable medium (not shown) such as a hard disk or a CD-ROM drive.

In general, the non-transitory computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory or other solid storage technologies; a CD-ROM, a DVD or another optical storage; and a cassette, a magnetic tape, a disk storage or other magnetic storage devices. Certainly, a person skilled in art can know that the computer storage medium is not limited to the foregoing several types. The system memory 704 and the mass storage device 707 may be collectively referred to as a memory.

According to various embodiments of this application, the server 700 may further be connected, by using a network such as the Internet, to a remote computer on the network and run. That is, the server 700 may be connected to a network 712 by using a network interface unit 711 connected to the system bus 705, or may be connected to another type of network or remote computer system (not shown) by using the network interface unit 711.

The memory further includes one or more programs. The one or more programs are stored in the memory and include instructions for performing the video denoising method provided in the embodiments of this application.

A person of ordinary skill in the art may understand that, all or some of the steps of the video denoising method in the foregoing embodiments may be implemented by a program instructing relevant hardware. The program may be stored in a computer-readable storage medium. The storage medium may include: a ROM, a RAM, a magnetic disk, an optical disc, or the like.

A person of ordinary skill in the art may understand that, all or some of the steps of the video denoising method in the foregoing embodiments may be implemented by a program instructing relevant hardware. The program may be stored in a computer-readable storage medium. The storage medium may include: a ROM, a RAM, a magnetic disk, an optical disc, or the like.

The sequence numbers of the foregoing embodiments of this application are merely for description purpose, and are not intended to indicate the preference among the embodiments.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A video denoising method performed by a computing device, the method comprising:
   acquiring a current frame of a target video;
   in accordance with a determination that the current frame is a P frame or a B frame in the target video:
      determining a plurality of reference frames of the current frame from the target video according to a pre-existing time domain reference relationship between the current frame and each of the plurality of reference frames that is established by an encoder and represented by a respective motion vector;
      determining a plurality of reference blocks in the plurality of reference frames corresponding to a current block in the current frame, wherein a degree of matching between each reference block in a respective reference frame and the current block is greater than a matching threshold; and
      performing denoising on the current block according to the plurality of reference blocks, further including:
         performing pre-denoising on the current block by using pixels of one or more spatially neighboring blocks in the current frame and a two-dimensional (2D) denoising algorithm;
         calculating a weight matrix of the plurality of reference blocks based on a three-dimensional (3D) denoising algorithm according to the respective degrees of matching between the plurality of reference blocks and the current block; and
         performing weighted summation by using pixels of the current block, pixels of the plurality of reference blocks, and the corresponding weight matrix to obtain outputted pixels of the current block after denoising.

2. The method according to claim 1, further comprising:
   determining, for each matching block of the plurality of matching blocks corresponding to one of the plurality of reference frames, a respective degree of matching between the matching block and the current block; and
   performing denoising on the current block only by using the two-dimensional (2D) denoising algorithm in response to a determination that the degrees of matching between the plurality of matching blocks and the current block are all less than or equal to the matching threshold.

3. The method according to claim 1, further comprising:
   after acquiring the current frame of the target video,
   in accordance with a determination that the current frame is an I frame in the target video:
      performing denoising on the I frame by using the 2D denoising algorithm.

4. The method according to claim 1, further comprising:
   determining, by using a noise monitoring algorithm, whether an internal variance of the current block is greater than a denoising threshold before determining the plurality of reference blocks in the plurality of reference frames; and
   performing the denoising on the current block when the internal variance of the pixels within the current block of the current frame is greater than the denoising threshold.

5. A computing device comprising a processor and a memory, the memory storing a plurality of computer programs, the computer programs, when executed by the processor, cause the computing device to perform a plurality of operations including:
   acquiring a current frame of a target video;
   in accordance with a determination that the current frame is a P frame or a B frame in the target video:
      determining a plurality of reference frames of the current frame from the target video according to a pre-existing time domain reference relationship between the current frame and each of the plurality of reference frames that is established by an encoder and represented by a respective motion vector;
      determining a plurality of reference blocks in the plurality of reference frames corresponding to a current block in the current frame, wherein a degree of matching between each reference block in a respective reference frame and the current block is greater than a matching threshold; and
      performing denoising on the current block according to the plurality of reference blocks, further including:
         performing pre-denoising on the current block by using pixels of one or more spatially neighboring blocks in the current frame and a two-dimensional (2D) denoising algorithm;
         calculating a weight matrix of the plurality of reference blocks based on a three-dimensional (3D) denoising algorithm according to the respective degrees of matching between the plurality of reference blocks and the current block; and
         performing weighted summation by using pixels of the current block, pixels of the plurality of reference blocks, and the corresponding weight matrix to obtain outputted pixels of the current block after denoising.

6. The computing device according to claim 5, wherein the plurality of operations further comprise:
   determining, for each matching block of the plurality of matching blocks corresponding to one of the plurality of reference frames, a respective degree of matching between the matching block and the current block; and
   performing denoising on the current block only by using the two-dimensional (2D) denoising algorithm in response to a determination that the degrees of matching between the plurality of matching blocks and the current block are all less than or equal to the matching threshold.

7. The computing device according to claim 5, wherein the plurality of operations further comprise:

after acquiring the current frame of the target video,
in accordance with a determination that the current frame is an I frame in the target video:
performing denoising on the I frame by using the 2D denoising algorithm.

8. The computing device according to claim 5, wherein the plurality of operations further comprise:
determining, by using a noise monitoring algorithm, whether an internal variance of the current block is greater than a denoising threshold before determining the plurality of reference blocks in the plurality of reference frames; and
performing the denoising on the current block when the internal variance of the pixels within the current block of the current frame is greater than the denoising threshold.

9. A non-transitory computer-readable storage medium storing computer programs, the computer programs, when executed by a processor of a computing device, cause the computing device to perform a plurality of operations including:
acquiring a current frame of a target video;
in accordance with a determination that the current frame is a P frame or a B frame in the target video:
determining a plurality of reference frames of the current frame from the target video according to a pre-existing time domain reference relationship between the current frame and each of the plurality of reference frames that is established by an encoder and represented by a respective motion vector;
determining a plurality of reference blocks in the plurality of reference frames corresponding to a current block in the current frame, wherein a degree of matching between each reference block in a respective reference frame and the current block is greater than a matching threshold; and
performing denoising on the current block according to the plurality of reference blocks, further including:
performing pre-denoising on the current block by using pixels of one or more spatially neighboring blocks in the current frame and a two-dimensional (2D) denoising algorithm;
calculating a weight matrix of the plurality of reference blocks based on a three-dimensional (3D) denoising algorithm according to the respective degrees of matching between the plurality of reference blocks and the current block; and
performing weighted summation by using pixels of the current block, pixels of the plurality of reference blocks, and the corresponding weight matrix to obtain outputted pixels of the current block after denoising.

10. The non-transitory computer-readable storage medium according to claim 9, wherein the plurality of operations further comprise:
determining, for each matching block of the plurality of matching blocks corresponding to one of the plurality of reference frames, a respective degree of matching between the matching block and the current block; and
performing denoising on the current block only by using the two-dimensional (2D) denoising algorithm in response to a determination that the degrees of matching between the plurality of matching blocks and the current block are all less than or equal to the matching threshold.

11. The non-transitory computer-readable storage medium according to claim 9, wherein the plurality of operations further comprise:
determining, by using a noise monitoring algorithm, whether an internal variance of the current block is greater than a denoising threshold before determining the plurality of reference blocks in the plurality of reference frames; and
performing the denoising on the current block when the internal variance of the current block is greater than the denoising threshold.

\* \* \* \* \*